July 12, 1932.                H. H. SAMUELS                1,867,282
                     GERMICIDAL TRANSMITTER MOUTHPIECE
                            Filed July 14, 1931
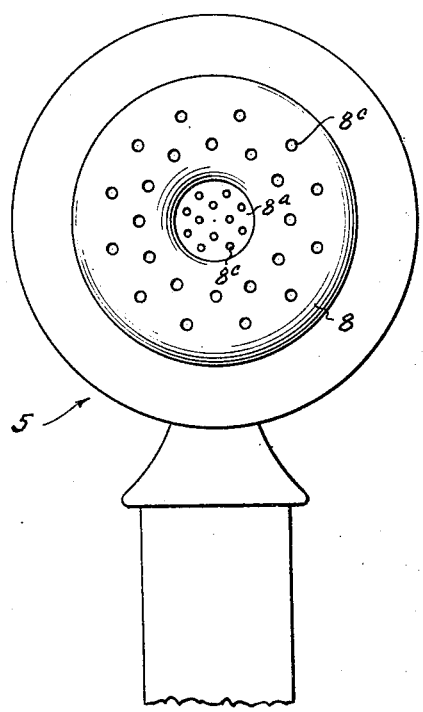
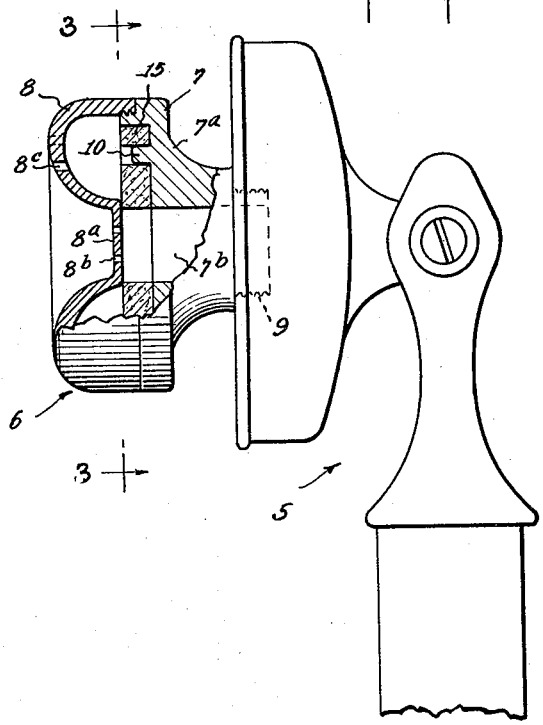
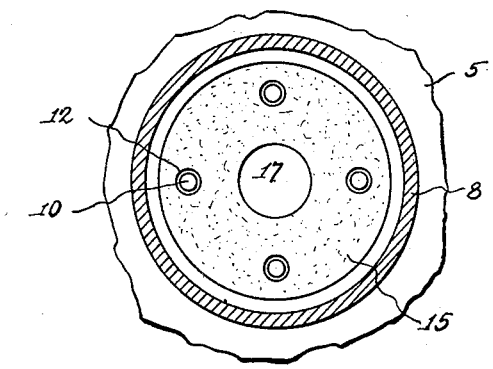
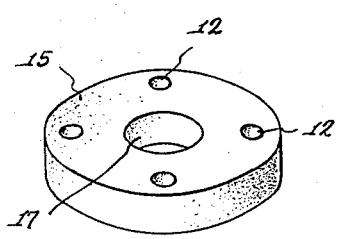
HARRY H. SAMUELS
            INVENTOR Patented July 12, 1932

1,867,282

UNITED STATES PATENT OFFICE

HARRY H. SAMUELS, OF NEW YORK, N. Y.

GERMICIDAL TRANSMITTER MOUTHPIECE

Application filed July 14, 1931. Serial No. 550,783.

This invention relates to germicidal mouthpieces for telephones and speaking tubes, and it has for one of its objects the provision of a novel mouthpiece embodying an economical and effective solid germicidal material, which is preferably in the form of a cake.

Another object of the invention is the provision of a mouthpiece in which the germicidal material may be quickly placed and replaced.

A further object of the invention is the provision of a mouthpiece containing a very effective germicidal cake containing material vaporizable at a proper rate at ordinary temperatures to render the mouthpiece sanitary for the protection and promotion of health.

A still further object of the invention is the provision of a mouthpiece containing solid germicidal material effective over a comparatively long period of time, the germicidal material requiring renewal very infrequently.

That the device which I have invented fulfills the foregoing and other objects will be appreciated from a reading of the following specification.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Fig. 1 is a front elevation of a telephone mouthpiece constructed in accordance with my invention and shown associated with a telephone transmitter.

Fig. 2 is a side elevation of Fig. 1, partly broken away and partly in section.

Fig. 3 is a vertical section taken on line 3—3 of Fig. 2, looking in the direction of the arrows; and Fig. 4 is a perspective view of the germicidal cake preferably employed in a mouthpiece and shown, in Figs. 2 and 3, within a mouthpiece.

Referring to the drawing for a more detailed description thereof, the numeral 5 indicates a telephone transmitter to which is connected a mouthpiece 6. The mouthpiece comprises a rear member 7 and a front member 8 threadedly connected thereto. The rear member 7 has a reduced threaded portion 9 for connection to the transmitter 5. Extending outwardly from the back 7a of the rear member 7 are four lugs or projections 10, which fit into apertures 12 formed in a cake 15 containing germicidal material, said germicidal material being adapted to vaporize at ordinary temperatures. The cake 15 may be made of any suitable germicidal material adapted to give off vapors at an effective rate at ordinary temperatures. Such a cake may be prepared by putting under heavy pressure a mixture consisting mainly of paradichlorbenzene crystals and a relatively small quantity of phenol, liq. cresolis and oil of pine needles.

The cake 15, which is supported on the mentioned lugs or projections 10, has a central aperture 17 in alignment with an aperture 7b, passing through the rear member 7 of the mouthpiece, so that sound waves will not be obstructed by the germicidal cake. The mentioned cake is held in position by the inset portion 8a of the front member 8 of the mouthpiece, said portion 8a being provided with a plurality of holes or apertures 8b, so that sound waves may pass therethrough and through the central aperture 17 of the cake, and the aperture 7b of the rear member 7 to the diaphragm of the transmitter. The front of the member 8 is provided with a plurality of apertures 8c so that vapors from the mentioned cake may pass therethrough, as well as through the apertures 8b, and contact with the front surface of the member 8 to destroy microorganisms.

What I claim as new is:

A telephone mouthpiece comprising front and rear members of which the latter is adapted for connection to a telephone transmitter and the former has a detachable threaded engagement with the latter, said rear member having a central opening therethrough, and a cake containing germicidal material vaporizable at ordinary temperatures and disposed against the front face of the rear member and completely enclosed by the front member, the front member having a central depressed portion disposed in the plane of the front face of the cake, the cake having an opening therethrough in axial alignment with that in the rear member and the front member having perforations in the depressed portion and perforations disposed in its front face arranged in circular series with the depressed portion as a center, the rear member being provided with lugs on its front face and the cake having openings therein disposed for the entrance of said lugs to retain the cake in position on the rear member.

In testimony whereof I hereby affix my signature.

HARRY H. SAMUELS.